United States Patent [19]

Tateishi et al.

[11] Patent Number: 4,864,990

[45] Date of Patent: Sep. 12, 1989

[54] INJECTION SYSTEM FOR A DUAL-FUEL ENGINE

[75] Inventors: Mataji Tateishi; Etsuo Kunimoto; Hiroshi Nakagawa; Tatsuo Takaishi, all of Nagasaki, Japan

[73] Assignee: Mitsubishi Jukogyo Kabushiki Kaisha, Tokyo, Japan

[21] Appl. No.: 159,944

[22] Filed: Feb. 24, 1988

[30] Foreign Application Priority Data

Mar. 15, 1987 [JP] Japan .................................. 62-59816

[51] Int. Cl.$^4$ ............................................ F02M 43/00
[52] U.S. Cl. .................................. 123/304; 123/276 E
[58] Field of Search ............... 123/304, 305, 445, 506, 123/459, 276 E, 575

[56] References Cited

U.S. PATENT DOCUMENTS

| | | | |
|---|---|---|---|
| 1,132,581 | 3/1915 | Hein | 123/304 |
| 4,583,508 | 4/1986 | Scheeter | 123/459 |
| 4,597,364 | 7/1986 | Young | 123/276 E |
| 4,632,083 | 12/1986 | Reggiani | 123/276 E |
| 4,699,103 | 10/1987 | Tsukahara et al. | 123/304 |
| 4,700,672 | 10/1987 | Baguena | 123/304 |
| 4,754,733 | 7/1988 | Steiger | 123/276 E |

Primary Examiner—Raymond A. Nelli
Attorney, Agent, or Firm—Wenderoth, Lind & Ponack

[57] ABSTRACT

An injection system for a dual-fuel diesel engine operated by means of a main fuel having a low cetane number and an auxiliary fuel having a high cetane number is disclosed. The injection system includes a pressure regulating check valve provided in parallel to a delivery valve in a main fuel injection pump and allowing fuel flow only in a direction opposite to that in the delivery valve. A control valve feeds the auxiliary fuel pressurized by a fuel feed pump to a fuel injection valve at an appropriate feed rate and at appropriate fuel feed timing regulated by a control device. A check valve is provided in the proximity of a fuel reservoir of the fuel injection valve in a flow passageway of the auxiliary fuel.

2 Claims, 5 Drawing Sheets

INJECTION SYSTEM FOR A DUAL-FUEL ENGINE

BACKGROUND OF THE INVENTION

1. Field of the Invention

The present invention relates to an injection system for a dual-fuel engine.

2. Description of the Prior Art

One example of a fuel injection system for a diesel engine of the heretofore known type is shown in FIG. 6. In this figure, reference numeral 101 designates a fuel tank, numeral 102 designates a fuel feed pump, numeral 103 designates a fuel injection pump main body, numeral 104 designates a plunger in the fuel injection pump, numeral 105 designates a barrel in the same, numeral 106 designates a delivery valve, numeral 107 designates an injection pipe, numeral 108 designates a fuel injection valve main body, numeral 109 designates an injection nozzle in the fuel injection valve, numeral 110 designates a needle valve in the same, numeral 111 designates a fuel reservoir in the same, and numeral 112 designates a spring in the same.

Since such fuel injection system for a diesel engine in the prior art is constructed with an object of injecting a single kind of fuel, in order to inject two kinds of fuel it is necessary to mix these two kinds of fuel preliminarily to feeding of the fuel, and it is impossible to inject the two kinds of fuel clearly separated from each other during an injection period.

Furthermore, in such fuel injection system in the prior art, there are shortcomings that if a hardly self-ignitable fuel such as aromatic oil, lower alcohol, etc., that is, a fuel having a low cetane number, is used in a diesel engine, then starting of the engine is difficult, even if the engine should be started, diesel knocking will occur and hence continuation of operation is difficult, and that such factors result in adverse effects upon a life of the engine.

SUMMARY OF THE INVENTION

It is therefore one object of the present invention to provide an injection system for a dual-fuel engine which is free from the above-described shortcomings of the heretofore known system, and in which use of hardly self-ignitable fuel (having a low cetane number) can be facilitated.

According to one feature of the present invention, there is provided an injection system for a diesel engine operated by means of a main fuel having a low cetane number and an auxiliary fuel having a high cetane number, which includes a pressure regulating check valve provided in parallel to a delivery valve in a main fuel injection pump and allowing fuel flow only in a direction opposite to that in the delivery valve, a control valve for feeding the auxiliary fuel pressurized by a fuel feed pump to a fuel injection valve at an appropriate fuel feed rate and at appropriate fuel feed timing regulated by a control device, and a check valve provided in the proximity of a fuel reservoir of the fuel injection valve in a flow passageway of the auxiliary fuel.

According to another feature of the present invention, there is provided the above-featured injection system for a dual-fuel engine, wherein, representing the valve-opening pressures of the pressure regulating check valve, the check valve and the fuel injection valve by $P_R$, $P_P$ and $P_O$, respectively, these valve-opening pressures are preset so as to fulfil the relationships of $P_R < P_O$ and $P_P < P_O$, and the control device controls in such manner that feed of the auxiliary fuel is effected during a period after completion of injection by the main fuel injection pump and before the next injection operation.

Since the injection system for a dual-fuel engine according to the present invention is constructed as described above, it can inject hardly self-ignitable fuel and well self-ignitable fuel clearly separated from each other, and moreover, as the ratio of the injection rates of the two kinds of fuel can be arbitrarily controlled, hardly self-ignitable but inexpensive fuel easily can be utilized in a diesel engine.

The above-mentioned and other objects, features and advantages of the present invention will become more apparent by reference to the following description of one preferred embodiment of the present invention taken in conjunction with the accompanying drawings.

BRIEF DESCRIPTION OF THE DRAWINGS

In the accompanying drawings:

FIG. 1 is a cross-sectional view of one preferred embodiment of the invention;

FIGS. 2 to 4 are similar cross-sectional views of the same preferred embodiment showing successive steps in the operation of the injection system; and FIG. 5 is a diagram showing timing of opening and a period of valve opening of a control valve.

DESCRIPTION OF THE PREFERRED EMBODIMENT

Figure 1:
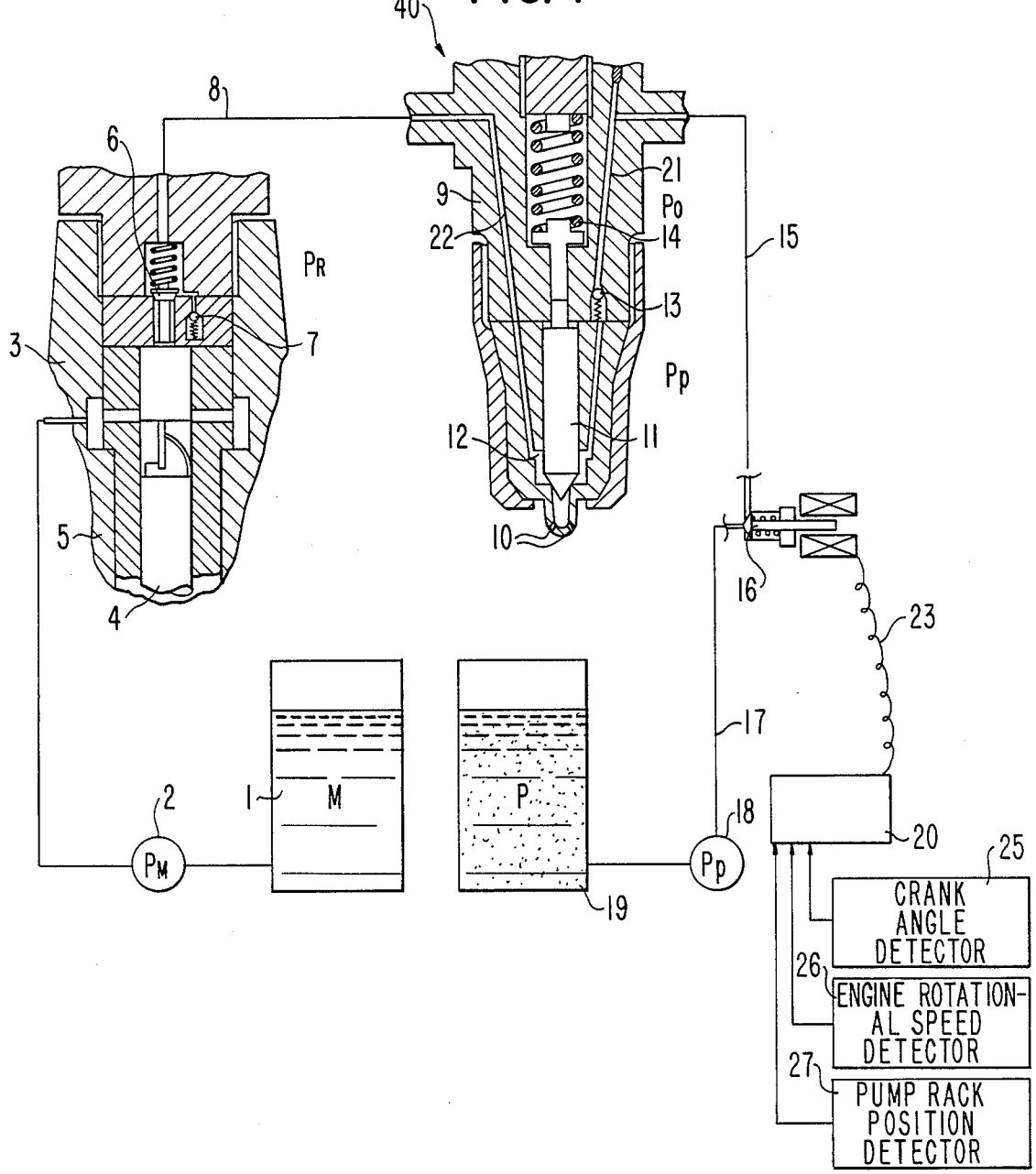
FIGS. 1 to 5 are illustrations of an injection system according to the present invention.

Now description will be made of one preferred embodiment of the present invention with reference to FIGS. 1 to 5. In these figures, reference numeral 1 designates a main fuel (hardly self-ignitable fuel) tank, numeral 2 designates a fuel feed pump for the main fuel, numeral 3 designates a main fuel injection pump main body, numeral 4 designates a plunger in the fuel injection pump, numeral 5 designates a barrel in the same, numeral 6 designates a delivery valve, numeral 7 designates a pressure regulating check valve provided in a bypass, numeral 8 designates a main fuel injection pipe, numeral 40 designates a fuel injection valve, numeral 9 designates a fuel injection valve main body, numeral 10 designates an injection nozzle in the fuel injection valve, numeral 11 designates a needle valve in the same, numeral 12 designates a fuel reservoir in the same, and numeral 14 designates a spring acting on the needle valve 11. On the other hand, reference numeral 13 designates a check valve for an auxiliary fuel (well or easily self-ignitable fuel), numeral 15 designates an auxiliary fuel injection pipe, numeral 16 designates an auxiliary fuel injection rate control valve, numeral 17 designates an auxiliary fuel feed pipe, numeral 18 designates an auxiliary fuel feed pump, numeral 19 designates an auxiliary fuel tank, and numeral 20 designates a control device for regulating an amount of feed of the auxiliary fuel and timing of the feed of the auxiliary fuel. The present embodiment is characterized in that the fuel injection system includes, besides a main fuel feed system, an auxiliary fuel feed system in which the amount of feed is controlled by electronic control, and provision is made such that injection through the fuel injection nozzle 10 is first of the auxiliary fuel and thereafter is of the main fuel. More particularly, in the above-mentioned fuel injection valve 40, in addition to main fuel passageway 22, there is provided an auxiliary fuel passageway 21 having check valve 13, and auxiliary fuel passageway 21 is connected to a fuel outlet of the control valve 16 through the auxiliary fuel injection pipe 15.

Figure 5:
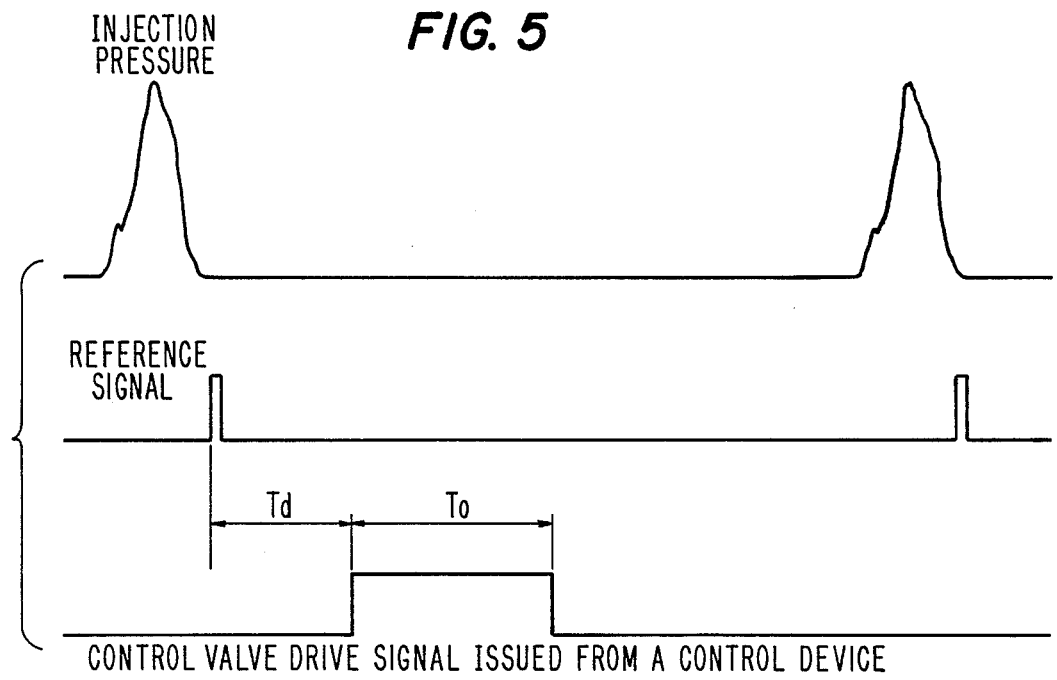
Figure 6:
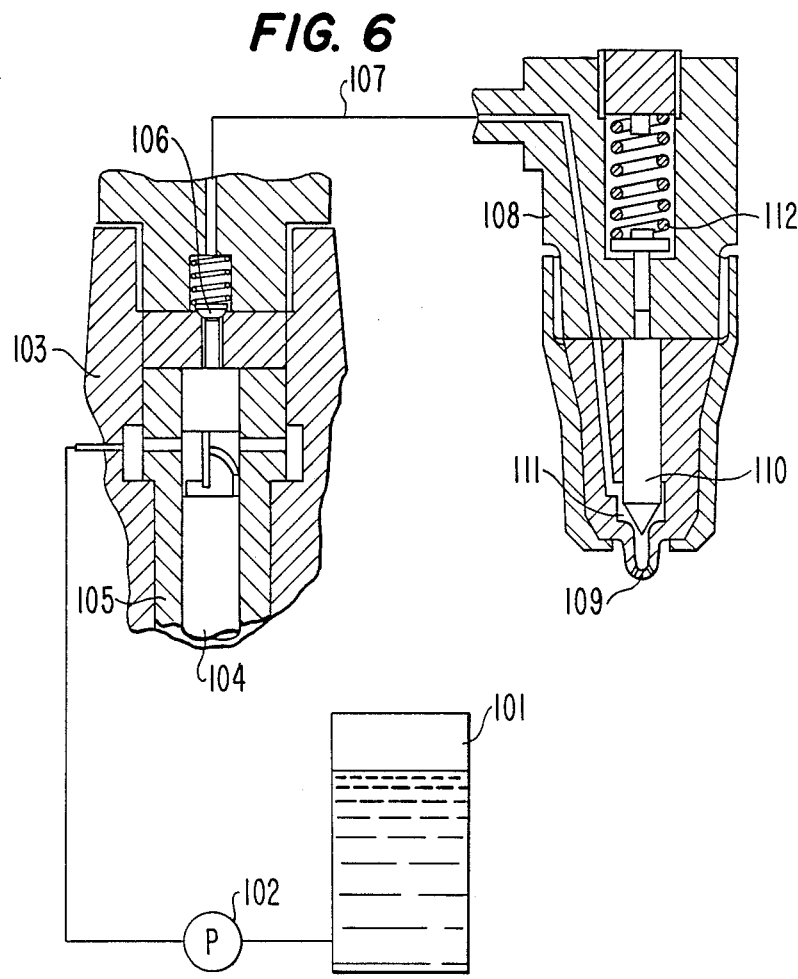
FIG. 6 is a cross-sectional view of an injection system in the prior art.

In addition, the above-mentioned control valve 16 has its fuel inlet connected to the auxiliary fuel tank 19 via the auxiliary fuel feed pump 18, and also valve 16 is electrically connected to the control device 20 through wires 23. Furthermore, supplied to the control device 20 are input signals sent from a crank angle detector 25, an engine rotational speed detector 26 and a rack position detector 27 of the injection pump 3. The control device 20 determines the timing of opening the control valve 16. More particularly, as shown in FIG. 5 a reference signal for a crank angle sent from the crank angle detector 25 is used as a trigger signal after it has been delayed by a certain delay time Td, and thereby the control valve 16 is operated. Still further, the control device 20 receives at its input signals issued from the engine rotational speed detector 26 and the injection pump rack position detector 27, and determines a valve opening period To of the control valve 16 depending upon the rotating state of the engine.

Figure 2:
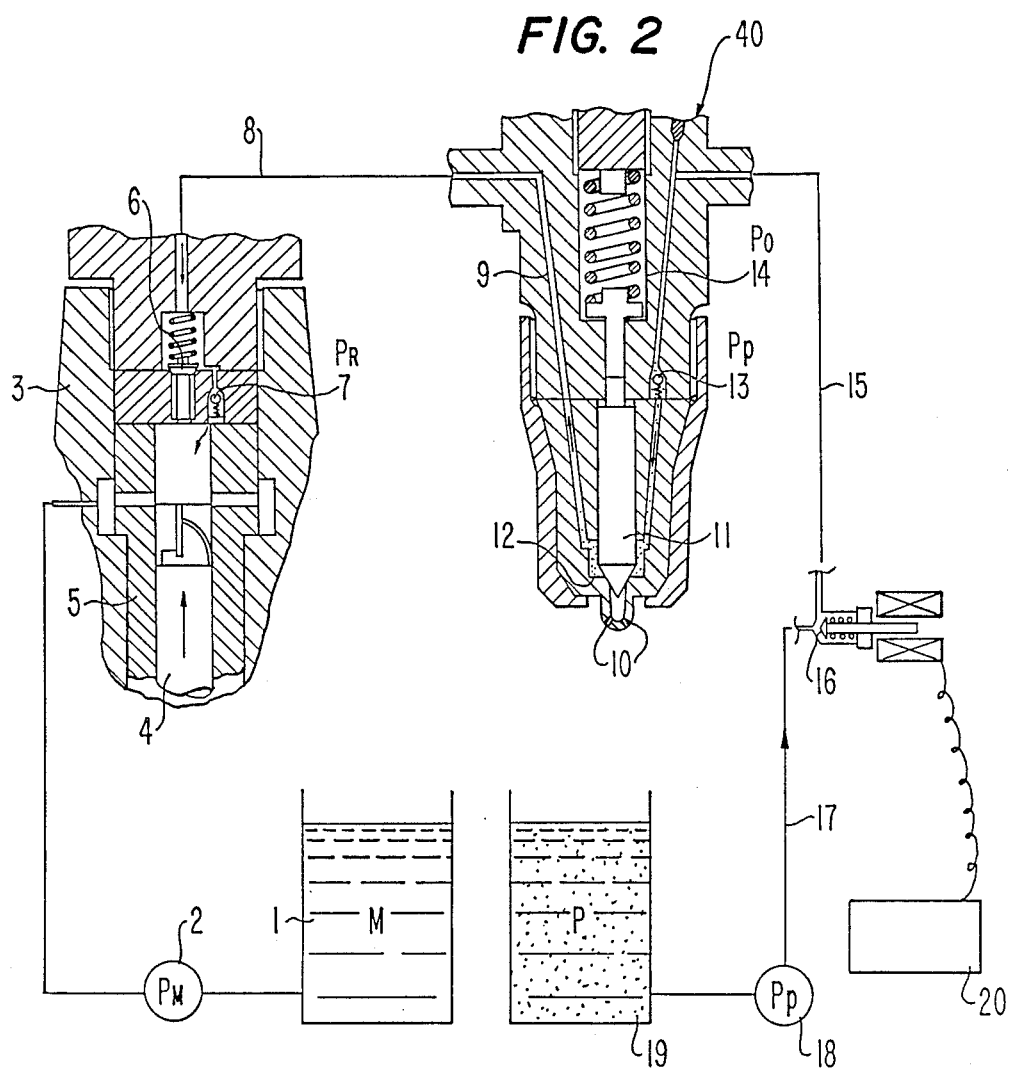

Next, description will be made of the operation of the above-described embodiment of the present invention. In FIG. 2, the auxiliary fuel sent from the auxiliary fuel tank 19 and pressurized by the fuel feed pump 18 passes through the pipe 17, and a predetermined amount thereof is fed into the fuel injection valve 9 through the injection pipe 15, during a period of interruption of the injection of the main fuel, by means of the control valve 16, the timing of the opening and the period of opening thereof being controlled by the control device 20 as described above. At this moment, with the valve-opening pressure of the pressure regulating check valve 7 in the main fuel injection pump 3 being $P_R$ and the valve-opening pressure of the check valve 13 for the auxiliary fuel being $P_P$, then by presetting conditions such that $P_O > P_R$ and $P_O > P_P$ with respect to the valve-opening pressure $P_O$ of the needle valve 11, the auxiliary fuel fed from the auxiliary fuel tank 19 can pass through the check valve 13 and can flow into the fuel reservoir 12 in the fuel injection valve 9. Consequently, main fuel existing in fuel reservoir 12 is pushed back towards the main fuel injection pump 3 through the injection pipe 8 and flows inversely into the plunger chamber by forcibly opening the pressure regulating check valve 7. The amount of the auxiliary fuel can be controlled to be a necessary amount by regulating the timing and period of the opening and closing of the control valve 16 with the aid of the control device 20, and thereby, the fuel reservoir 12 is filled with the auxiliary fuel.

Figure 3:
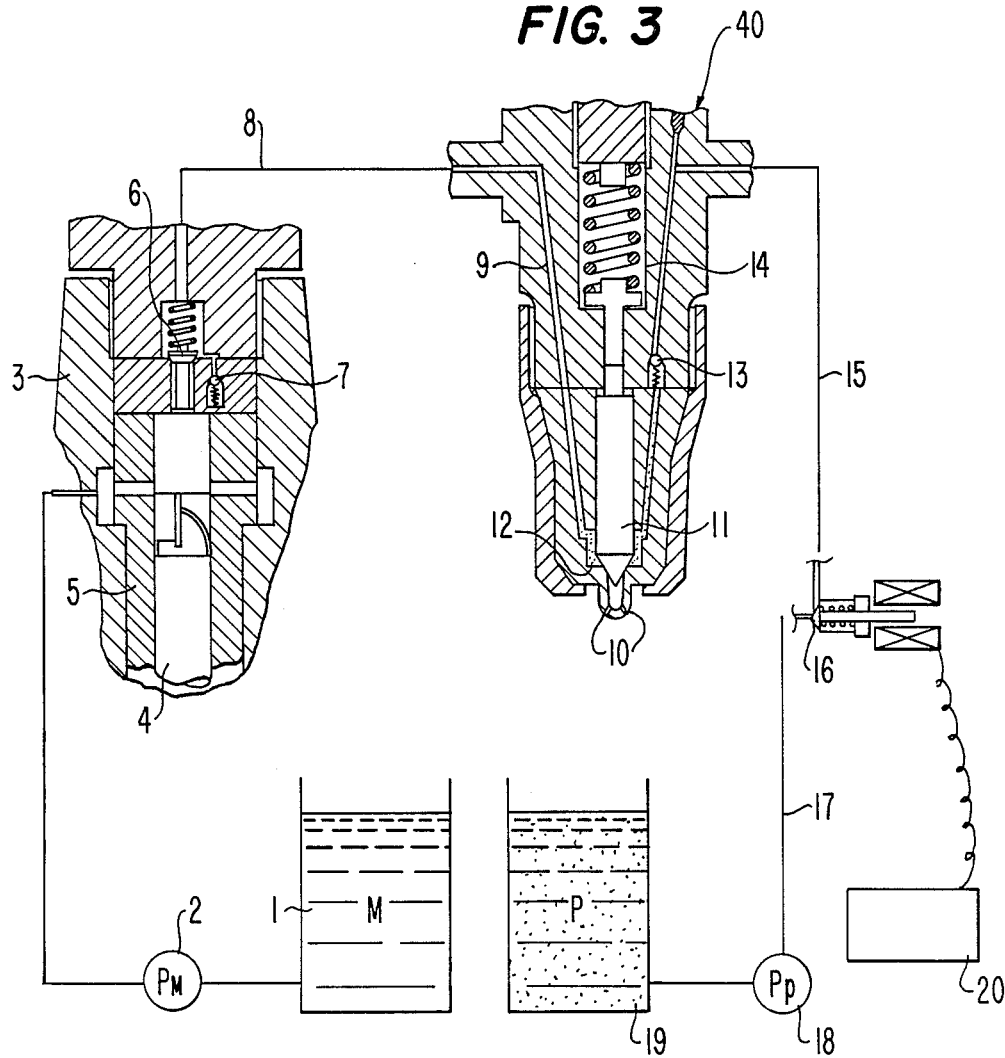

FIG. 3 shows conditions just before fuel injection. In this case, all the valves are closed, the auxiliary fuel enters the oil reservoir 12 in the fuel injection valve 9 and the main fuel injection pipe 8 and a subsequent portion is filled with the main fuel (hardly self-ignitable fuel).

Figure 4:
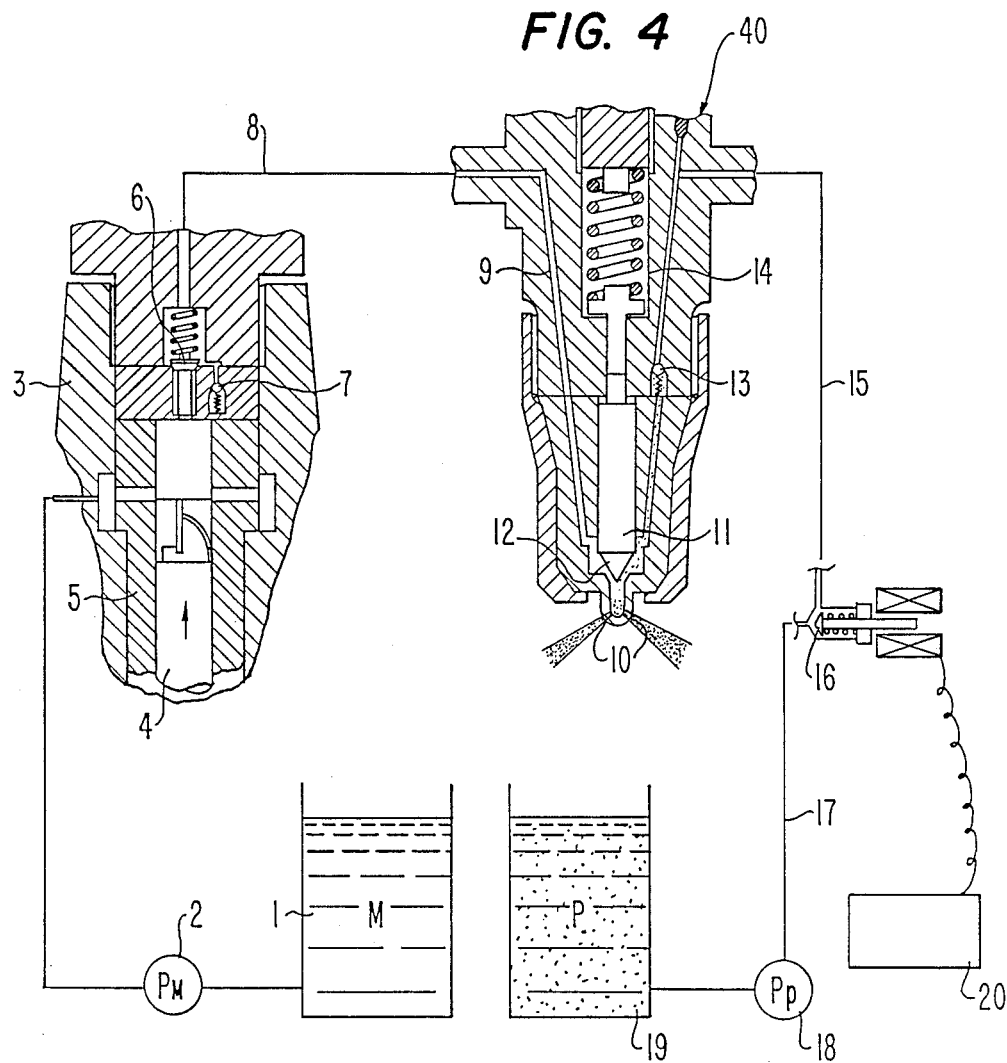

FIG. 4 shows conditions where the plunger 4 in the main fuel injection pump 3 is rising during a fuel injection condition, the delivery valve 6 is pushed up and fuel feed commences. In this figure, the main fuel emitted from the main fuel injection pump 3 is fed to the fuel injection valve 9 through the main fuel injection pipe 8. The fuel reservoir 12 of the fuel injection valve 9 already has been filled with auxiliary fuel fed from the auxiliary fuel injection rate control valve 16, and hence, the main fuel fed to the fuel injection valve pushes some auxiliary fuel out of the fuel reservoir toward the needle valve. Thereby the pressure in the oil reservoir 12 of the valve would be raised up to $P_O$ or hither, and hence the needle valve 11 opens against the pressing force of the valve spring 14 and fuel injection starts through the injection nozzle 10. At this time, the auxiliary fuel (well self-ignitable fuel) existing in the fuel reservoir 12 is ejected first, and subsequently the main fuel is ejected. It is to be noted that since the auxiliary fuel system is closed at the check valve 13, even if an injection pressure is applied thereto, the auxiliary fuel will not flow reversely.

Owing to the above-described construction and operation of the fuel injection system according to the present invention, well self-ignitable fuel and hardly self-ignitable fuel can be injected successively in this sequence and be clearly separated from each other. Therefore, ignition is easy and even hardly self-ignitable fuel can be burnt without generating diesel knocking. Moreover, a single fuel injection valve can suffice, the increase in cost is slight due to single valve construction, the ratio of amounts of two kinds of fuel can be controlled arbitrarily, and even with hardly self-ignitable fuel an excellent engine performance can be achieved.

While a principle of the present invention has been described above in connection with one preferred embodiment of the invention, it is a matter of course that many other apparently widely different embodiments of the present invention can be developed without departing from the spirit of the present invention.

What is claimed is:

1. An injection system for a dual-fuel diesel engine operated by a main fuel having a low cetane numer and an auxiliary fuel having a high cetane number, said system comprising:

a fuel injection valve including an injection nozzle, a fuel receiving reservoir and a valve member urged to a non-injection position closing communication between said reservoir and said nozzle and movable to an injection position opening communication therebetween;

a main fuel injection pump having a delivery valve for supplying a main fuel under pressure to said reservoir to thereby move said valve member to said injection position, said main fuel injection pump having a pressure regulating check valve in parallel to said delivery valve and allowing fuel flow only in a direction opposite to that of said delivery valve;

an auxiliary fuel passageway for supplying auxiliary fuel under pressure to said reservoir in said fuel injection valve;

a check valve in said auxiliary fuel passageway in proximity to said reservoir in said fuel injection valve for allowing auxiliary fuel flow in a direction toward said reservoir but preventing fuel flow in the opposite direction;

a control valve in said auxiliary fuel passageway for regulating the supply of auxiliary fuel through said auxiliary fuel passageway to said reservoir;

control means for controlling the opening of said control valve during a time period after completion of one fuel injection operation initiated by said main fuel injection pump and prior to the next fuel injection operation, and thereby for feeding auxiliary fuel to said reservoir at an appropriate fuel feed rate and at an appropriate fuel feed timing; and said pressure regulating check valve, said check valve and said valve member being openable under respective pressures of $P_R$, $P_P$ and $P_O$, wherein $P_R < P_O$ and $P_P < P_O$, such that during supply of said auxiliary fuel to said reservoir, main fuel in said reservoir may be pushed back through said pressure regulating check valve in said main fuel injection pump.

2. A system as claimed in claim 1, wherein said control means includes means for receiving signals from an engine crank angle detector, an engine rotational speed detector and an injection pump rack position detector, and means for controlling the timing of opening of said control valve as a function of signals received from the engine crank angle detector and for controlling the period of opening of said control valve as a function of signals received from the engine rotational speed detector and the injection pump rack position detector.

* * * * *